(12) United States Patent
Habermann et al.

(10) Patent No.: US 8,108,197 B2
(45) Date of Patent: Jan. 31, 2012

(54) METHOD TO VERIFY AN IMPLEMENTED COHERENCY ALGORITHM OF A MULTI PROCESSOR ENVIRONMENT

(75) Inventors: Christian Habermann, Stuttgart (DE); Ralf Winkelmann, Holzgerlingen (DE); Hans-Werner Tast, Weil im Schoenbuch (DE); Christian Jacobi, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/328,242

(22) Filed: Dec. 4, 2008

(65) Prior Publication Data

US 2010/0146210 A1    Jun. 10, 2010

(51) Int. Cl.
| | |
|---|---|
| *G06F 9/44* | (2006.01) |
| *G06F 13/10* | (2006.01) |
| *G06F 13/12* | (2006.01) |
| *G06F 13/00* | (2006.01) |
| *G06F 13/28* | (2006.01) |

(52) U.S. Cl. .......................... 703/21; 711/121; 711/122
(58) Field of Classification Search ................ 703/21; 711/121, 122
See application file for complete search history.

(56) References Cited

U.S. PATENT DOCUMENTS

| 6,108,737 | A  | * | 8/2000 | Sharma et al. ............... 710/107 |
| 6,763,432 | B1 | * | 7/2004 | Charney et al. ............... 711/144 |
| 2004/0088487 | A1 | * | 5/2004 | Barroso et al. ............... 711/122 |
| 2009/0171647 | A1 | * | 7/2009 | Mannava et al. ............... 703/21 |

OTHER PUBLICATIONS

Krygowski et al., "Functional verification of the IBM System z10 processor chipset," IBM Journal of Research and Development, Jun. 2008.*
Victor et al., "Functional verification of the POWER5 microprocessor and POWER5 multiprocessor systems," IBM Journal of Research and Development , vol. 49, No. 4.5, pp. 541-553, Jul. 2005.*
Pong et al., 1997, Verification techniques for cache coherence protocols. ACM Comput. Surv. 29, 1 (Mar. 1997), 82-126.*
Chen et al., "Hierarchical cache coherence protocol verification one level at a time through assume guarantee," High Level Design Validation and Test Workshop, 2007. HLVDT 2007. IEEE International , vol., No., pp. 107-114, Nov. 7-9, 2007.*

* cited by examiner

*Primary Examiner* — Dwin M Craig
*Assistant Examiner* — Aniss Chad
(74) *Attorney, Agent, or Firm* — Scully, Scott, Murphy & Presser, P.C.; Joseph P. Abate, Esq.

(57) ABSTRACT

A coherency algorithm for a multi processor environment to run on a single processor model is verified by: generating a reference model reflecting a private cache hierarchy of a single processor within the multi processor environment, stimulating the private cache hierarchy with simulated requests and/or cross invalidations from a core side and/or from a nest side, and augmenting all data available in the private cache hierarchy with two construction dates and two expiration dates, which are set based on interface events. Multi processor coherency is not observed if the cache hierarchy ever returns data to the processor with an expiration date that is older than the latest construction date of all data used before. Further, a single processor model and a computer program product can be employed to execute the method.

15 Claims, 5 Drawing Sheets

Figure 1:
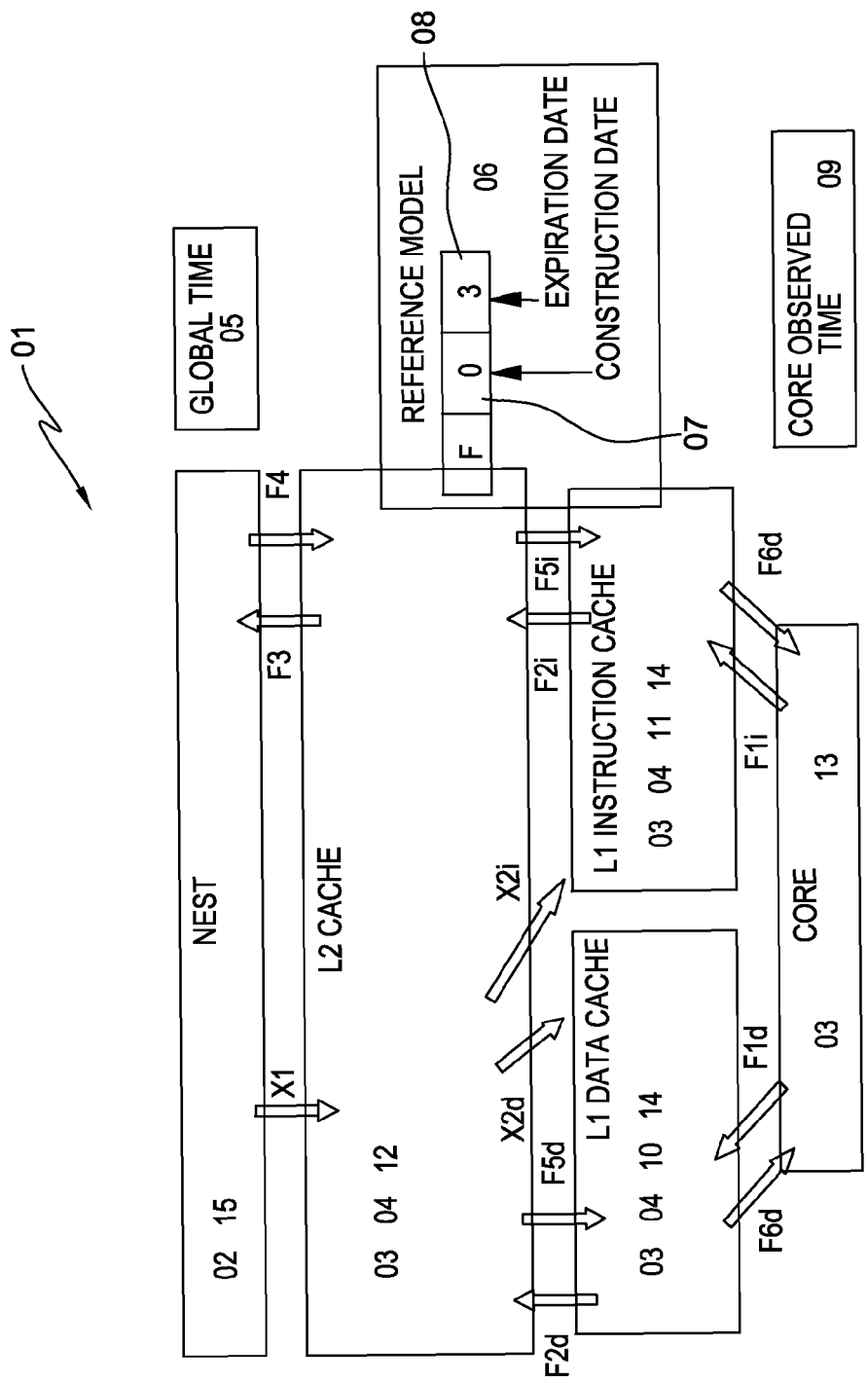

| | EVENT | ACTION / CHECK |
|---|---|---|
| F4 | FETCH RETURN WITH DATA FROM NEST FOR A CACHELINE | ACTION:<br>USE CURRENT GLOBAL TIME AS CONSTRUCTION DATE FOR THAT CACHELINE |
| X1 | CROSS INVALIDATE FROM NEST FOR A CACHELINE | ACTION:<br>USE CURRENT GLOBAL TIME AS EXPIRATION DATE FOR THAT CACHELINE |
| F6 | FETCH RETURN FROM ANY L1 CACHE TO ANY PROCESSOR UNIT | ACTION:<br>If (construction date > core observed time)   {<br>        core observed = construction date<br>}<br><br>CHECK:<br>if (expiration date <= core observed time)   {<br>        ERROR: coherency is violated<br>} |

TABLE 1

FIG. 2

| EVENT | ACTION / CHECK |
|---|---|
| FETCH RETURN WITH DATA FROM NEST TO L2 FOR A CACHELINE | ACTION:<br>USE CURRENT GLOBAL TIME AS L2 CONSTRUCTION DATE FOR THAT CACHELINE, THE LINE HAS NO EXPIRATION DATE |
| FETCH RETURN WITH DATA FROM L2 TO L1 FOR A CACHELINE (FETCH WAS NOT CANCELED) | ACTION:<br>NOTHING TO DO |
| FETCH RETURN WITH DATA FROM L2 TO L1 FOR A CACHELINE (FETCH WAS NOT CANCELED) | ACTION:<br>COPY L2 CONSTRUCTION DATE AND EXPIRATION DATE INTO THE L1 TIME STAMPS (L1d OR L1i DEPENDING ON WHO FETCHED) |
| CROSS INVALIDATE FROM NEST FOR A CACHELINE | ACTION:<br>USE CURRENT GLOBAL TIME AS EXPIRATION DATE FOR THAT CACHELINE, IF THE CACHELINE DID NOT ALREADY HAVE AN EXPIRATION DATE |
| FETCH RETURN FROM ANY L1 CACHE TO ANY PROCESSOR UNIT | ACTION:<br>if (construction date > core observed time) {<br>core observed = construction date<br>}<br><br>CHECK:<br>if (expiration date <= core observed time) {<br>ERROR: coherency is violated<br>} |

FIG. 5

METHOD TO VERIFY AN IMPLEMENTED COHERENCY ALGORITHM OF A MULTI PROCESSOR ENVIRONMENT

Method to verify an implemented coherency algorithm of a multi processor environment.

BACKGROUND OF THE INVENTION

The present invention relates to coherency algorithm verification of a multi processor environment.

In a multi processor environment where data can be changed by each single processor it is necessary to ensure that a single processor never uses outdated data. But to reach the best performance in multi processor systems it is useful to allow each single processor to work on old data as long as that single processor has not used newer data. Traditionally this coherency rule was tested on real hardware. But as the coherency algorithms that are implemented in modern processors are getting more complex and thus more error prone, it is important to verify those algorithms before building hardware, in order to reduce development costs. There are other verification methods to test coherency algorithms, but they have not solved the problem satisfying yet.

SUMMARY OF THE INVENTION

It is therefore an object of the invention to provide a method to verify an implemented coherency algorithm of a multi processor environment on a single processor model, a single processor model to verify an implemented coherency algorithm of a multi processor environment, plus a computer program product that allows to execute a method to verify an implemented coherency algorithm of a multi processor environment on a single processor model on a computer.

An object of the invention is met by a method to verify an implemented coherency algorithm of a multi processor environment on a single processor model, the method comprising the steps of:
- generating a reference model reflecting a private cache hierarchy of a single processor within a multi processor environment,
- stimulating the private cache hierarchy with simulated requests and/or cross invalidations from a processor core side and/or from a multi processor environment nest side,
- augmenting all data available in the private cache hierarchy with a construction date and an expiration date, set based on interface events, like e.g. requests and/or cross invalidations,
- wherein multi processor coherency is not observed if the cache hierarchy ever returns data to the processor with an expiration date that is older than the latest construction date of all data used before.

A main advantage of the method according to the invention is a reduced complexity that allows verifying coherency algorithms in a comprehensive way. With the method according to the invention it is now possible to verify the implemented coherency algorithm of a multi processor environment on a single processor model. Thus the method according to the invention employs a smaller model on which it is possible to cover a broader state space in the same time as on a multi processor model. In addition, the method according to the invention allows a better control over the stimuli as the stimuli generators are as close to the coherency relevant processor units as possible. Thus the simulation environment can be steered into corners that are critical with regard to the implemented coherency algorithm.

The verification method according to the invention works on a reference model that contains the whole private cache hierarchy of a single processor. A core idea of the method according to the invention is to augment all data available in that cache hierarchy with a construction date and an expiration date. Construction date and expiration date are set based on interface events. The multi processor coherency is not observed if the cache hierarchy ever returns data to the processor with an expiration date that is older than the latest construction time of all data used before.

A preferred embodiment of the method is characterized in that a core observed time is foreseen, holding the construction date of the youngest ever used data within the private cache hierarchy, in order to check that no old data was used after younger data was seen by the core. Having an expiration date for each cacheline that was hit by a cross invalidation and having a core observed time holding the construction date 07 of the youngest ever used cacheline it is possible to check that no old data was used after younger data was seen by the core.

Preferably the method according to the invention monitors three events, performs three actions and a single check.

According to a preferred embodiment of the method, a global time is foreseen, which is incremented ongoing, said global time is used as construction date, when new data arrives in the private cache hierarchy and said global time is used as expiration date when data, e.g. a cacheline, within the private cache hierarchy is hit by a cross invalidation.

A second aspect of the invention concerns a single processor model to verify an implemented coherency algorithm of a multi processor environment. Said single processor model is characterized by a reference model reflecting a private cache hierarchy of a single processor within a multi processor environment, said reference model keeping two time stamps, a construction date and an expiration date, for every cacheline that populates the private cache hierarchy of the processor, a random simulation driver simulating a core of the single processor, a simulation driver simulating a nest accommodating a plurality of processors within a multi processor environment, a global time counter that is incremented every simulation cycle and a core observed time unit.

In order to simulate the core and in order to simulate the nest preferably the random simulation driver and the simulation driver of the single processor model according to the invention generate requests and/or cross invalidations from a processor core side and/or from a multi processor environment nest side respectively.

In a particularly preferred embodiment of the invention, said method is performed by a computer program product stored on a computer usable medium comprising computer readable program means for causing a computer to perform the method mentioned above, when said computer program product is executed on a computer.

BRIEF DESCRIPTIONS OF THE DRAWINGS

Figure 3:
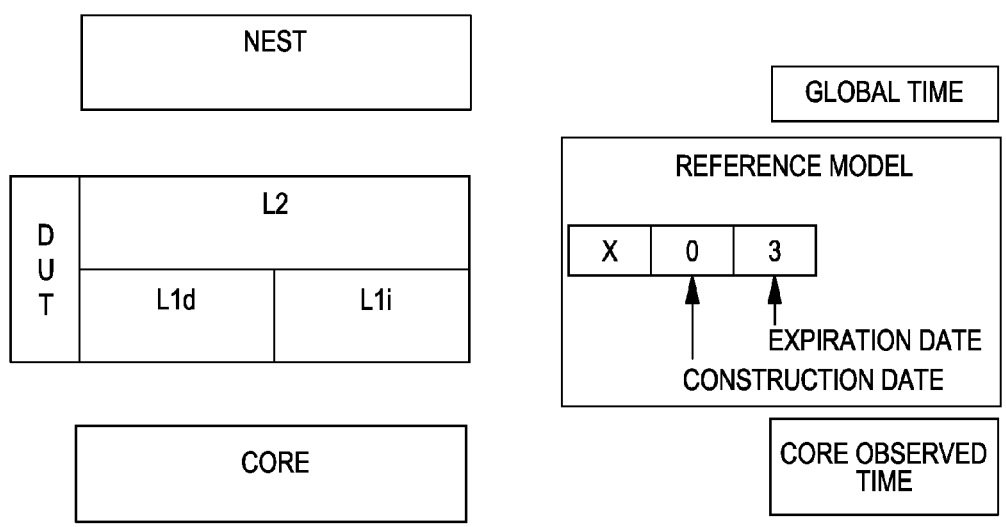
Figure 4:
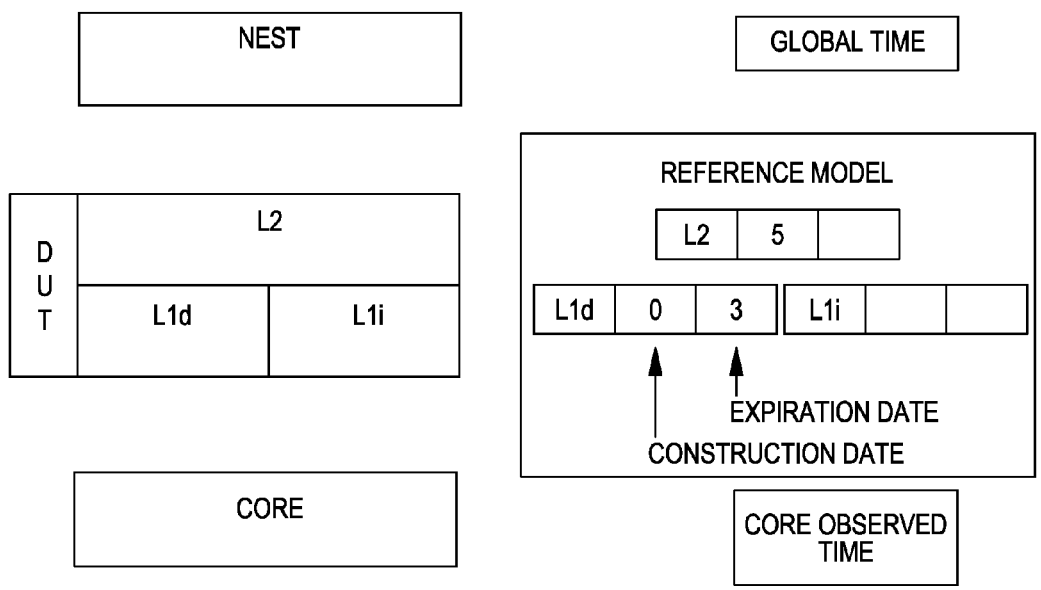

The foregoing, together with other objects, features, and advantages of this invention can be better appreciated with reference to the following specification, claims and drawings, with FIG. 1 showing a block diagram of a design under test and a stimulation environment, FIG. 2 showing a table 1 for a test scenario with a series of events, actions and check, FIG. 3 shows a block diagram similar to FIG. 1, but used to discuss a context for an alternate preferred embodiment of the invention, FIG. 4 showing a block diagram of design under test and a stimulation environment for an alternate preferred embodiment of this invention, and FIG. 5 showing a table for test scenario with a series of events, actions and checks for the alternate preferred embodiment.

DETAILED DESCRIPTION

A multi processor environment consists of a communication fabric called nest that embeds several single processors. In order to get data each processor has to make fetch requests to the nest. The smallest data package that can be requested is a cacheline that contains several bytes of data. The same cacheline is allowed to be used in several processors, as long as it is marked as a read-only copy.

If a processor wants to change a byte in cacheline F it needs to get exclusive rights on that cacheline F. The processor sends an exclusive fetch request on cacheline F to the nest. The nest generates read-only cross invalidates for all other processors and informs the requesting processor that it is now allowed to change cacheline F. The other processors can use their old read-only copy of cacheline F as long as it is not observable to the outside world, that they have used old data. The usage of an old copy of cacheline F is not observable as long as that processor is only working on cachelines that have not changed their data after cacheline F has been changed. This is true for all cachelines that were already stored within the private cache hierarchy of a single processor when the processor has received the read-only cross invalidate for cacheline F. So the point in time where a processor is no longer allowed to work with cacheline F is not determined by the read-only cross invalidate, but by the usage of any other cacheline G that was received from the nest after the cross invalidate for cacheline F was received. Because that cacheline G can contain data that allows the outside world to conclude that the processor used an old copy of cacheline F.

A single processor model 01 shown in FIG. 1 to be used to verify an implemented coherency algorithm of a multi processor environment comprises a random simulation driver 13 simulating a core 13 of a single processor 03 whose private cache hierarchy 04, comprising a Level Two (L2) cache 12 and a Level One (L1) cache 14, consisting of a L1 data cache 10 and a L1 instruction cache 11, is to be tested. The single processor model 01 further comprises a simulation driver 15 simulating the nest 02. The single processor model 01 also comprises a counter 05, a reference model 06 and a core observed time 09.

To implement the method according to the invention, a counter 05 called global time 05 is foreseen that is incremented every simulation cycle. Also a reference model 06 is foreseen, reflecting the private cache hierarchy 04 of a processor 03. This reference model 06 is able to keep two time stamps, a construction date 07 and an expiration date 08, for every cacheline that populates the private cache hierarchy 04 of the processor 03, and a core observed time 09.

The Design Under Test (DUT) 04 is a model containing all units of a processor 03 that are involved in the implemented coherency algorithm, i.e. the whole private cache hierarchy 04 of the processor 03. The private cache hierarchy 04 comprises a Level One (L1) cache 14 with a L1 data cache 10, a L1 instruction cache 11 plus a Level Two (L2) cache 12. The DUT 04 is stimulated with fetch requests from the processor side and receives data and cross invalidations from the nest 02.

In a multi processor environment, shared data can simultaneously exist in several private caches of several processors of the multi processor environment in a read-only state. If one cache should subsequently receive a request for a store operation to one data block or cache block, e.g. a cacheline, which is already in the private cache, so no data transfer is required. However, this cache block must be invalidated in all other private caches of the other processors of the multi processor environment. For this cross invalidations are used.

The method according to the invention monitors three events, performs three actions and a single check for verification of multiprocessor coherency on a single processor model.

The events are:
Fetch return with data from nest 02 for a cacheline.
Cross Invalidate (CI) from nest 02 for a cacheline.
Fetch return from any L1 cache 14 to any processor 03 unit.

The actions are:
Use current global time 05 as construction date for that cacheline.
Use current global time 05 as expiration date for that cacheline.
If (construction date 07>core observed time 09) {core observed time 09=construction date 07}.

The check is:
(expiration date 07<=core observed time 09)
{ERROR: coherency is violated}.

New data enters the private cache hierarchy 04 from the nest 02 and gets a construction date 07. Due to prefetching, it might not be used at once, but waits in the L2 cache 12 until it is really used. Other data can still be used although a cross invalidate has already been received for their cachelines. Those cachelines are marked with an expiration date 08. Once a new cacheline is requested by a core unit 13 of the processor 03 it updates the core observed time 09 to the construction date 07 of that cacheline. If ever a cacheline is returned from the private cache hierarchy 04 that has an older expiration date 08 than the core observed time 09 this is a violation of coherency, which is flagged as an error.

In FIG. 1 the two relevant operations for the verification method are shown with arrows. The arrows F1$i$, F1$d$, F2$i$, F2$d$, F3, F4, F5$i$, F5$d$, F6$d$ show the processing of fetch requests. The arrows X1, X2$d$, X2$i$ show the processing of cross invalidations.

Fetch requests are generated by a random simulation driver 13 called CORE. The random simulation driver 13 simulates a core 13 of a processor 03, whose private cache hierarchy 04, comprising the L2 cache 12 and the L1 cache 14, consisting of the L1 data cache 10 and the L1 instruction cache 11, is to be tested. Operand fetches (arrow F1$d$) are issued from the random simulation driver 13 against the L1 data cache 10, whereas instruction fetches (arrow F1$i$) are issued against the L1 instruction cache 11. If the L1 cache 14 contains the requested data, the fetch can be directly answered (arrows F6$d$, F6$i$), if not the fetch request is passed on to the L2 cache 12 (arrows F2$d$, F2$i$). If the L2 cache 12 contains the data the fetch request is answered (arrows F5$d$, F5$i$), if not it is passed on to a simulation driver 15 called NEST (arrow F3). The simulation driver 15 simulates the nest 02. The nest 02 will answer these fetch requests (arrow F4) and the data will be passed on to the core 03 (arrows F5$d$→F6$d$, F5$i$→F6$i$). In addition the nest 02 is generating random XIs that enter the L2 cache 12 (X1) and are forwarded to the L1 data cache 10 and/or to the L1 instruction cache 11 if they contain the line (X2d, X2i). In a real multiprocessor environment a cross invalidation for a cacheline F is generated when another processor wants to change data within that cacheline F. So to say, once a processor receives a cross invalidation for cacheline F (arrow X1) this cacheline might contain old data. In the verification method according to the invention, whenever a cacheline is hit by a cross invalidation (arrow X1) the current global time 05 is stored as an expiration date 06 for that cacheline in the reference model 06.

As long as the core 13 is not using data that was received after the cross invalidation for cacheline F, it can not be detected whether the cacheline F was used before the cross invalidation was received or after. That is the reason why the core 13 can keep on working with F even though a cross invalidation for F was already received.

If new data is received from the nest 02 (arrow F4) the current global time 05 is stored as the construction date 07 of that cacheline.

Whenever data is returned to the core 13 (arrow F6d or F6i) the construction date 07 of that data is used to update the core observed time 09, if the construction date 07 is larger than the core observed time 09. Thus the core observed time 09 always holds the construction date 07 of the youngest data that was ever used.

As stated above modern multiprocessor environments allow the individual core 13 to work with old data as long as it can not be observed. Having an expiration date 08 for each cacheline that was hit by a cross invalidation and a core observed time 09 holding the construction date 07 of the youngest ever used cacheline it is possible to check that no old data was used after younger data was seen by the core 13.

The check is:
if (expiration date<=core observed time)
{ERROR: coherency is violated}
The check is done whenever data is returned to the core 13 (arrow F6).

Table 1 with reference to FIG. 1 shows a test scenario with a series of events and actions and check.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

For example, as shown in FIG. 3, the private cache hierarchy can consist of several layers of caches, i.e. level 1 and level 2 cache. Each level can in addition be split into several caches. In the picture above the level 1 cache is split into a data cache (L1d) and a instruction cache (L1i). In complex private cache hierarchies it is possible that a higher level cache can contain newer data for a cacheline X than a lower level cache. There are at least two reasons for this: The first is the latency between the NEST→L2 fetch response and the L2→L1 fetch response and the second is fetch cancellation. The L1 might cancel a fetch request after the L2 has already received new data. The L2 will then install the new data but the L1 will not install it, though it might have an older copy of that cacheline.

The solution for the situation described above is to have two time stamps for every cache that is populating the private cache hierarchy of the design under test (DUT) and not just two for the whole private cache hierarchy. Thus, it is possible to distinguish old data in the L1 from new data in the L2.

As shown in FIG. 4, a cacheline X receives two time stamps for every cache in the private cache hierarchy. Thus, it is possible to detect a situation above where the cacheline X already contains new data in the second level cache but still holds old data in the L1 cache.

The original Event Action/Check table will change to the table as shown in FIG. 5.

The invention claimed is:

1. A method for testing an implemented coherency algorithm of a multi processor environment on a single processor model, said method comprising:
   providing a simulated multi processor environment including a random stimulation driver, a private cache hierarchy in communication with said random stimulation driver, and a nest in communication with said private cache hierarchy;
   implementing a coherency algorithm on said simulated multi processor environment by:
      generating a reference model configured to operate on every cacheline that populates said private cache hierarchy and to keep a set of two time stamps on said every cacheline, said set of two time stamps including a construction date representing a first global time when new data arrives at said private cache hierarchy and an expiration date representing a second global time when said private cache hierarchy is hit by a cross invalidation,
      stimulating said private cache hierarchy with interface events including at least one of simulated requests from said random simulation driver and cross invalidations from said nest, and
      augmenting data in a plurality of cachelines in said private cache hierarchy with said set of two time stamps by operating said reference model, wherein each time stamp is set based on occurrence of said interface events; and
   determining presence of an error in said implemented coherency algorithm when said private cache hierarchy ever returns data to said random simulation driver with an expiration date that is older than a latest construction date of all data used before.

2. The method according to claim 1, wherein said reference model is configured to update a core observed time of said random stimulation driver, whenever data is returned to said random stimulation driver, with a construction date of said returned data if said construction date of said returned data is greater than said core observed time.

3. The method according to claim 1, wherein said reference model monitors three types of events comprising:
   any fetch return with data from said nest for a cacheline;
   any cross invalidate from said nest for a cacheline; and
   any fetch return from any L1 cache to said random stimulation driver.

4. The method according to claim 3, wherein said reference model performs three types of actions comprising:
   using a current global time as a construction date for a cacheline upon a fetch return with data from said nest for a cacheline;
   using a current global time as an expiration date for a cacheline upon a cross invalidate from said nest for a cacheline; and
   using a core observed time as a construction date if said construction date is greater than said expiration date upon a fetch return from any L1 cache to said random stimulation driver.

5. The method according to claim 4, wherein said reference model performs a single check for validation of multi processor coherency, wherein said check compares a pair of an expiration date and a core observed time after performing at least one of said three types of actions and generates an error signal for violation of coherency if said compared core observed time is greater than said compared expiration time.

6. A system for testing a coherency algorithm of a multi processor environment employing a single processor model, said system comprising: a computer, a simulated multi processor environment including a random stimulation driver, a private cache hierarchy in communication with said random stimulation driver, and a nest in communication with said private cache hierarchy, wherein said system is configured to:
  implement a coherency algorithm on said simulated multi processor environment by:
    generate a reference model configured to operate on every cacheline that populates said private cache hierarchy and to keep a set of two time stamps on said every cacheline, said set of two time stamps includin~a construction date representing a first global time when new data arrives at said private cache hierarchy and an expiration date representing a second global time when said private cache hierarchy is hit by a cross invalidation,
    stimulate said private cache hierarchy with interface events including at least one of simulated requests from said random simulation driver and cross invalidations from said nest, and
    augment data in a plurality of cachelines in said private cache hierarchy with said set of two time stamps by operating said reference model, wherein each time stamp is set based on occurrence of said interface events; and
  determine presence of an error in said implemented coherency algorithm when said private cache hierarchy ever returns data to said random simulation driver with an expiration date that is older than a latest construction date of all data used before.

7. The system according to claim 6, wherein said reference model is configured to update a core observed time of said random stimulation driver, whenever data is returned to said random stimulation driver, with a construction date of said returned data if said construction date of said returned data is greater than said core observed time.

8. The system according to claim 6, wherein said reference model monitors three types of events comprising:
  any fetch return with data from said nest for a cacheline;
  any cross invalidate from said nest for a cacheline; and
  any fetch return from any L1 cache to said random stimulation driver.

9. The system according to claim 8, wherein said reference model performs three types of actions comprising:
  using a current global time as a construction date for a cacheline upon a fetch return with data from said nest for a cacheline;
  using a current global time as an expiration date for a cacheline upon a cross invalidate from said nest for a cacheline; and
  and using a core observed time as a construction date if said construction date is greater than said expiration date upon a fetch return from any L1 cache to said random stimulation driver.

10. The system according to claim 9, wherein said reference model performs a single check for validation of multi processor coherency, wherein said check compares a pair of an expiration date and a core observed time after performing at least one of said three types of actions and generates an error signal for violation of coherency if said compared core observed time is greater than said compared expiration time.

11. A computer program product stored on a non-transitory computer usable medium, comprising computer readable program means configured to operate on a system comprising a simulated multi processor environment including a random stimulation driver, a private cache hierarchy in communication with said random stimulation driver, and a nest in communication with said private cache hierarchy, wherein said computer readable program means is configured to cause a computer to:
  implement a coherency algorithm on said simulated multi processor environment by:
    generate a reference model configured to operate on every cacheline that populates said private cache hierarchy and to keep a set of two time stamps on said every cacheline, said set of two time stamps including a construction date representing a first global time when new data arrives at said private cache hierarchy and an expiration date representing a second global time when said private cache hierarchy is hit by a cross invalidation,
    stimulate said private cache hierarchy with interface events including at least one of simulated requests from said random simulation driver and cross invalidations from said nest, and
    augment data in a plurality of cachelines in said private cache hierarchy with said set of two time stamps by operating said reference model, wherein each time stamp is set based on occurrence of said interface events; and
  determine presence of an error in said implemented coherency algorithm when said private cache hierarchy ever returns data to said random simulation driver with an expiration date that is older than a latest construction date of all data used before.

12. The computer program product according to claim 11, wherein said reference model is configured to update a core observed time of said random stimulation driver, whenever data is returned to said random stimulation driver, with a construction date of said returned data if said construction date of said returned data is greater than said core observed time.

13. The computer program product according to claim 11, wherein said reference model monitors three types of events comprising:
  any fetch return with data from said nest for a cacheline;
  any cross invalidate from said nest for a cacheline; and
  any fetch return from any L1 cache to said random stimulation driver.

14. The computer program product according to claim 13, wherein said reference model performs three types of actions comprising:
  using a current global time as a construction date for a cacheline upon a fetch return with data from said nest for a cacheline;
  using a current global time as an expiration date for a cacheline upon a cross invalidate from said nest for a cacheline; and
  using a core observed time as a construction date if said construction date is greater than said expiration date upon a fetch return from any L1 cache to said random stimulation driver.

15. The computer program product according to claim 14, wherein said reference model performs a single check for validation of multi processor coherency, wherein said check compares a pair of an expiration date and a core observed time after performing at least one of said three types of actions and generates an error signal for violation of coherency if said compared core observed time is greater than said compared expiration time.

* * * * *